(12) United States Patent
McKay

(10) Patent No.: US 7,503,595 B2
(45) Date of Patent: Mar. 17, 2009

(54) FITTING HAVING LOW VOLUME CREVICE

(75) Inventor: Albert A. McKay, Stoney Creek (CA)

(73) Assignee: Lokring Technology, LLC, Willoughby, OH (US)

( * ) Notice: Subject to any disclaimer, the term of this patent is extended or adjusted under 35 U.S.C. 154(b) by 193 days.

(21) Appl. No.: 11/107,505

(22) Filed: Apr. 15, 2005

(65) Prior Publication Data

US 2005/0264006 A1    Dec. 1, 2005

Related U.S. Application Data

(60) Provisional application No. 60/564,530, filed on Apr. 22, 2004.

(51) Int. Cl.
 *F16L 13/14* (2006.01)
(52) U.S. Cl. .................. 285/382; 285/382.1; 285/382.2
(58) Field of Classification Search .............. 285/382.1, 285/382.2, 382
See application file for complete search history.

(56) References Cited

U.S. PATENT DOCUMENTS

| 3,675,949 | A | * | 7/1972 | Dawson ................... 285/382.2 |
| 4,482,174 | A | | 11/1984 | Puri |
| 4,768,275 | A | | 9/1988 | Schmitz et al. |
| 5,110,163 | A | | 5/1992 | Benson et al. |
| 5,114,191 | A | | 5/1992 | Sareshwala |
| 5,181,752 | A | * | 1/1993 | Benson et al. ............ 285/382.2 |
| 5,303,958 | A | * | 4/1994 | Hyatt et al. .............. 285/382.2 |
| 5,305,510 | A | | 4/1994 | Croft et al. |
| 5,709,418 | A | | 1/1998 | Benson et al. |
| 6,131,964 | A | * | 10/2000 | Sareshwala ................. 285/382 |
| 6,467,752 | B2 | | 10/2002 | Woods |
| 6,692,040 | B1 | * | 2/2004 | McKay et al. .............. 285/382 |

FOREIGN PATENT DOCUMENTS

| DE | 556 114 | C | 8/1932 |
| EP | 1 043 535 | A | 10/2000 |
| EP | 1 195 550 | A | 4/2002 |
| FR | 706 420 | A | 6/1931 |

OTHER PUBLICATIONS

European Search Report dated Aug. 29, 2005 corresponding to European Application No. EP 05 25 2509.

* cited by examiner

*Primary Examiner*—Aaron M Dunwoody
(74) *Attorney, Agent, or Firm*—Fay Sharpe LLP

(57) ABSTRACT

A fitting for a fluid conduit includes a coupling body having an inside surface for engaging an outside surface of a fluid conduit and a shoulder portion for limiting axial insertion of the fluid conduit into the coupling body. At least one seal is formed on the inside surface of the coupling body. The at least one seal includes a proximal seal adjacent the shoulder portion. A ring is annularly disposed on the coupling body urging the at least one seal into the fluid conduit to seal and mechanically connect the coupling body to the fluid conduit.

15 Claims, 4 Drawing Sheets

FITTING HAVING LOW VOLUME CREVICE

This application claims priority of U.S. Provisional Patent Application Ser. No. 60/564,530, filed Apr. 22, 2004, entitled "LOW VOLUME CREVICE FITTING" and is expressly incorporated herein by reference.

BACKGROUND

The present invention relates, in general, to fluid fittings and, more particularly, to an improved fitting having a low volume crevice. In one embodiment, the fitting includes a coupling body having an inside surface for engaging an outside surface of a fluid conduit and a shoulder portion for limiting axial insertion of the fluid conduit into the coupling body. The fitting further includes at least one seal formed on the inside surface of the coupling body. The at least one seal includes a proximal seal adjacent the shoulder portion. The fitting also includes a ring annularly disposed on the coupling body urging the at least one seal into the fluid conduit to seal and mechanically connect the coupling body to the fluid conduit. The improved fitting will be described with particular reference to this embodiment, but it is to be appreciated that the improved fitting is also amenable to other like applications.

Various types of fittings have been developed for joining tubes and pipes to other tubes and pipes, or to other fluid apparatus such as pumps, fluid motors, actuation cylinders, etc. For thin walled tubing or pipe, various types of fittings are used which compress against the outside diameter of the tube or pipe to create a seal. One particular type of such a fitting includes a swage ring which is forced over the fitting to compress it radially inwardly against the tube or pipe to create a seal. Generally, this type of fitting has one or more circumferential teeth or ridges on its inside diameter which, when compressed inwardly by a swage ring, engage the outside diameter of the tube or pipe to create one or more leak-tight mechanical connections or joints between the tube or pipe and the fitting. This engagement of the sealing teeth of the fitting with the tube or pipe causes the pipe to be deformed radially inwardly, with the coupling body of the fitting located externally about the tube or pipe.

Examples of such mechanically attached fittings are provided in U.S. Pat. Nos. 4,482,174; 5,110,163; 5,114,191; and 6,692,040. One example installation tool employable for attaching these types of fittings to a tube or pipe is described in U.S. Pat. No. 5,305,510. All the teachings and substance of these patents are hereby expressly incorporated by reference into the present application.

The fittings described above are suitable for a variety of applications. However, in some applications, these fittings allow residual amounts of whatever passes through the fitting to accumulate in the fitting and/or between the fitting and the tube or pipe to which the fitting is attached. More particularly, a fluid or other substance may undesirably accumulate between the end of the pipe and the fitting body, as well as between an outside surface of the pipe and the fitting, extending axially to the first seal. Reducing this amount of space between the pipe and the fitting could desirably lessen the area in which residual amounts may accumulate. Thus, any improvement to the fitting that would lessen the area in which residue may gather is deemed desirable.

SUMMARY

In accordance with one aspect, a new and improved fitting for a fluid conduit is provided. More particularly, in accordance with this aspect, the fitting includes a coupling body having an inside surface for engaging an outside surface of a fluid conduit and a shoulder portion for limiting axial insertion of the fluid conduit into the coupling body. At least one seal is formed on the inside surface of the coupling body. The at least one seal includes a proximal seal adjacent the shoulder portion. A ring is annularly disposed on the coupling body urging the at least one seal into the fluid conduit to seal and mechanically connect the coupling body to the fluid conduit.

In accordance with another aspect, a fitting for making connections with a pipe includes a coupling body having an inside surface defining a bore for receiving a pipe. A radial section is defined along the inside surface to limit axial insertion of the pipe. A ring is fitted over the coupling body for sealing and mechanically connecting the coupling body to the pipe. An axisymmetrical main seal is formed on the inside surface of the coupling body that seals and connects to the pipe when the ring is installed on the coupling body. An axisymmetrical inboard seal is formed on the inside surface of the coupling body. The inboard seal is located adjacent the radial section and is axially spaced from the main seal. The inboard seal seals and connects to the pipe when the ring is installed on the coupling body. An axisymmetrical outboard seal is formed on the inside surface of the coupling body. The outboard seal is axially spaced from the main seal and seals and connects to the pipe when the ring is installed on the coupling body.

In accordance with yet another aspect, a fitting for making connections with a pipe includes a coupling body having an inside surface defining a bore for receiving a pipe, a shoulder for limiting axial insertion of the pipe, and a plurality of seals extending into the bore from the inside surface. A swage ring is fitted over the coupling body for sealingly and mechanically connecting the plurality of seals with the pipe. The plurality of seals includes a circumferentially continuous main seal spaced axially inward relative to a distal end of the coupling body and a circumferentially continuous inboard seal spaced axially inward relative to the main seal and closely adjacent the shoulder.

DETAILED DESCRIPTION

Figure 1:
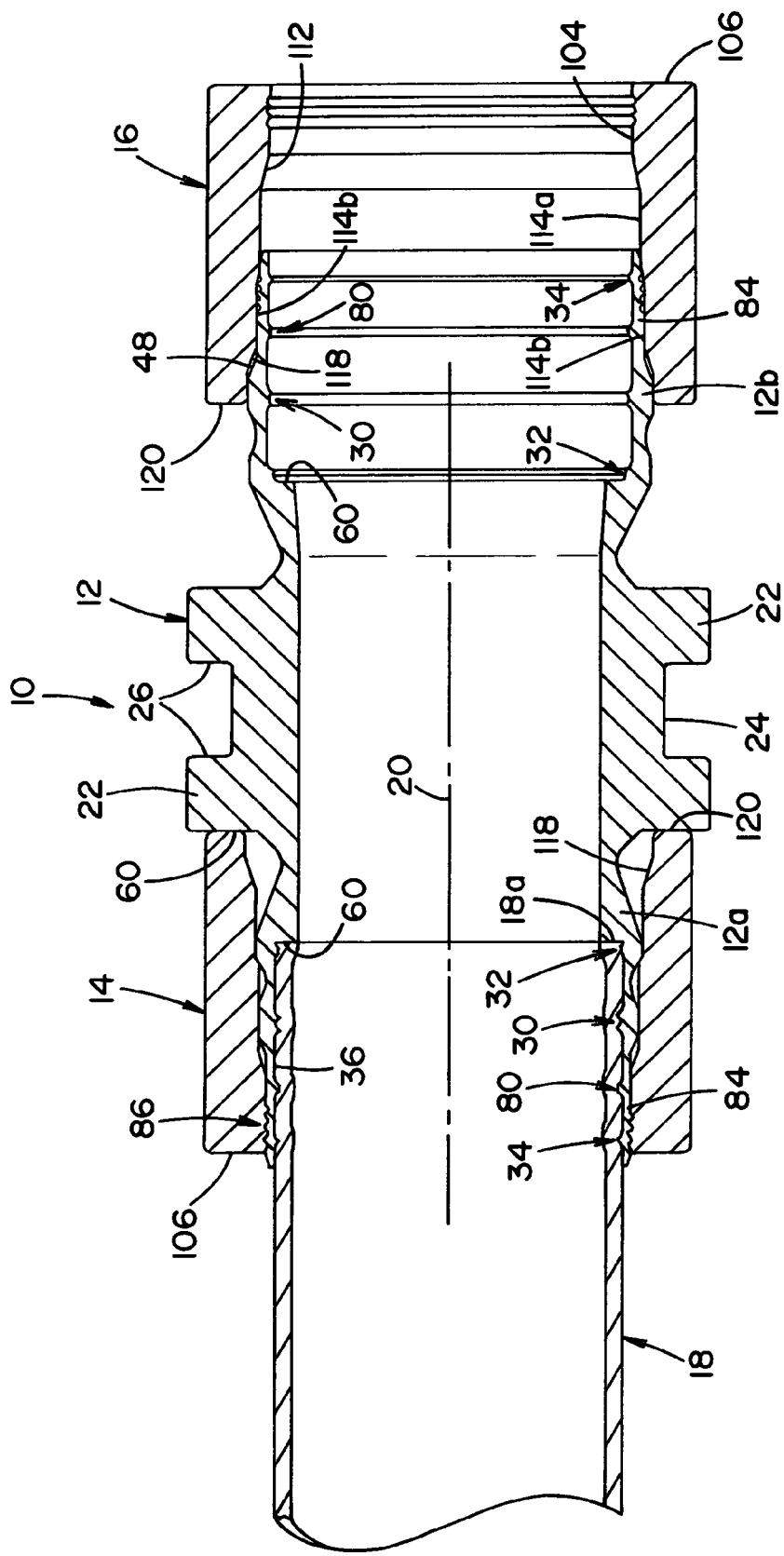
FIG. 1 is a cross-sectional view of a fitting having a low volume crevice including a coupling body and a pair of swage rings for connecting to a first tube or pipe to a second tube or pipe.

Referring now to the drawings wherein the showings are for purposes of illustrating one or more exemplary embodiments and are not to be construed as limiting the invention, a fitting having a low volume crevice is shown for coupling two sections of tube or pipe together and generally designated by reference numeral 10. With specific reference to FIG. 1, the fitting 10 includes a coupling or coupling body 12 and at least one swage ring. in the illustrated embodiment, two swage rings 14,16 are shown and can be used to couple two sections of coaxial tubing or pipe together (only one pipe, pipe 18, is shown). As illustrated, the components 12,14,16 of the fitting 10 are generally axisymmetrical about axis 20. In the illustrated embodiment of FIG. 1, as will be described in more detail below, swage ring 14 is shown in a fully installed position coupling the fitting 10 to pipe 18 and swage ring 16 is shown in a partially installed, shipping ready position, prior to coupling to a pipe.

The coupling body 12, also referred to herein as a connector body, of the illustrated fitting 10 includes first portion or sleeve 12*a* (which forms the left side of the coupling body in FIG. 1) and a second portion or sleeve 12*b* (which forms the right side of the coupling body in FIG. 1). The first sleeve 12*a* is adapted to receive the first section of tube or pipe 18 and the second sleeve 12*b* is adapted to receive the second section of tube or pipe (not shown). As will be described in more detail below, when the swage rings 14,16 are axially forced onto respective sleeves 12*a,* 12*b* with the tube or pipe sections received therein, the sleeves become mechanically connected to and sealed with the received tube or pipe sections.

In one exemplary embodiment, the coupling body 12 and the swage rings 14,16 are formed of stainless steel and used in conjunction with a tube or pipe formed of stainless steel. As will be appreciated and understood by those skilled in the art, the coupling body 12 and swage rings 14,16 could alternately be formed of any of a variety of other fitting materials, including for example carbon steel, 90/10 copper nickel, 70/30 copper nickel. Likewise, the tube or pipe could be formed of a variety of other materials.

Additionally, those skilled in the art will understand and appreciate that the exact configuration of the fitting 10 can vary and need not include exactly two sleeves in a coaxial configuration, as shown in the illustrated embodiment. For example, the fitting 10 could be integrally formed or adapted to connect with another component or type of fitting, and may have any number of sleeves extending at various locations therefrom for connecting to one or more corresponding tubes. A particular example could be a combination fitting and ball-valve wherein the fitting 10 is combinable with a ball-valve in a similar manner as described in commonly owned U.S. Pat. No. 6,467,752, expressly incorporated herein by reference.

As will also be understood and appreciated by those skilled in the art, the sleeves 12*a,*12*b* are generally identical, except that they are axially mirrored relative to one another, and first sleeve 12*a* will be the primary sleeve described in further detail herein. In the illustrated embodiment, the sleeve 12*a* includes a circumferential flange or ridge 22 extending radially outwardly from exterior outside surface 24 of the body 12. As will be described in more detail below, the ridge 22 includes a tool engaging surface 26 which is used in joining the sleeve 12*a* to the adjacent swage ring 14 when connecting the fitting 10 to the pipe 18 received therein. Pipe 18 can alternately be referred to as a pipe section, tube, tube section or the like. As used herein, the terms "pipe," "pipe section," "tube," and "tube section" are used interchangeably and all such components or elements and their equivalents are to be considered acceptable for use with fitting 10.

Figure 2:
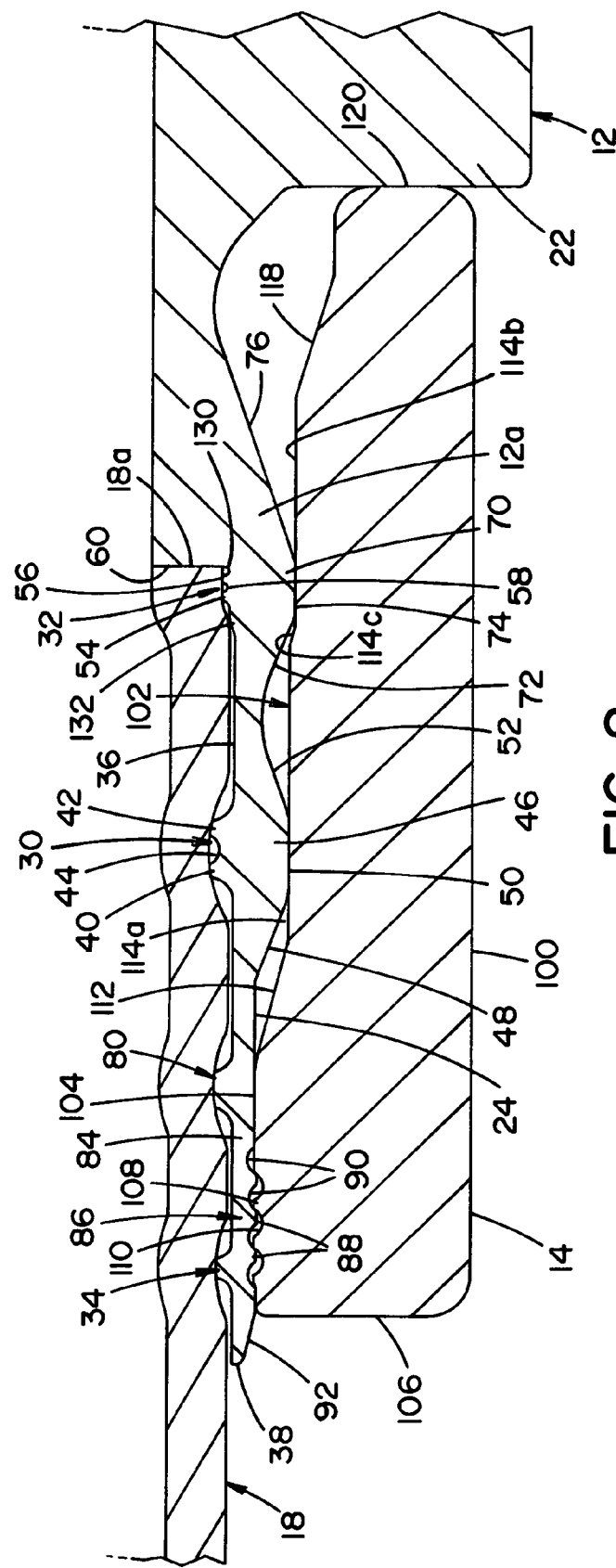
FIG. 2 is an enlarged partial cross-sectional view of the fitting of FIG. 1 showing one of the swage rings sealingly and mechanically connecting a coupling body of the fitting to a first tube inserted thereinto.

With additional reference to FIG. 2, the sleeve 12*a* includes a plurality of spaced apart seals, including main seal 30, inboard or proximal seal 32 and outboard or distal seal 34, for sealing between and mechanically connecting the coupling body 12 to pipe 18. The seals 30,32,34 are each positioned on or extend from interior surface 36 of the coupling body 12. As used herein, the terms "proximal" and "distal", as well as the terms "inboard" and "outboard", are used to generally indicate relative axial spacing, such as from the exterior flange 22 or the sleeve's distal end 38. Thus, the distal or outboard seal 34 is axially spaced relative to the flange 22 a greater distance than is the proximal or inboard seal 32.

The main seal 30 serves to provide a main fluid seal and mechanical connection with the tube or pipe 18, as will be described in more detail below. In the illustrated embodiment, the main seal 30 includes first tooth 40 and second tooth 42 which are axially spaced from and between the circumferential ridge 22, also referred to herein as a swage ring stop, and the distal end 38 of the coupling body 12. The two-tooth main seal arrangement is more fully described in commonly-owned U.S. Pat. No. 5,110,163, expressly incorporated herein by reference. The teeth 40,42 are slightly separated from one another by groove 44. It is to be appreciated by those skilled in the art that the main seal 30 could alternatively be formed as only a single tooth or more than two teeth. A main seal compression land 46, also referred to herein as a seal urging feature or projection, is formed on and extends radially from outside surface 24 adjacent the main seal 30. In the illustrated embodiment, the land 46 is directly opposite the main seal 30 and includes an abrupt upslope ramp 48, a plateau 50 and a downslope ramp 52.

The inboard or proximal seal 32 is located between the main seal 30 and the ridge 22, axially spaced from each. Like the main seal 30, the inboard seal 32 is adapted to provide a fluid seal and a mechanical connection with the tube or pipe 18. In the illustrated embodiment, the inboard seal 32 is a pair of teeth 54,56 slightly separated from one by groove 58, but it is to be appreciated by those skilled in the art that the inboard seal could be formed by a single tooth or more than two teeth. The proximal seal 32 is located closely adjacent a stop or shoulder 60. The shoulder 60, also referred to herein as a radial section, that is closely adjacent the teeth 54,56 prevents further insertion of the tube 18 into the fitting and, thus, abuts or is closely adjacent one end 18*a* of the tube 18.

An inboard compression land 70, also referred to herein as an inboard or proximal seal urging feature or projection, is formed on and extends radially from outside surface 24 adjacent inboard seal 32. In the illustrated embodiment, the land 70 is positioned directly opposite the inboard seal 32 and includes an abrupt upslope ramp 72, a plateau 74 and a fairly gradually downslope ramp 76. The plateau 74 is generally radially aligned (i.e., has a substantially similar outer diameter) with the plateau 50 of the main seal land 46. The configuration of the inboard land 70, particularly the gradually downsloping ramp 76, can have the effect of assisting in or facilitating driving the seals 30,32 into the pipe 18. In the illustrated embodiment, the plateau 74 is immediately opposite the inboard seal 32 and the stop 60, the ramp 72 extends from the plateau to the ramp 52 of the main seal land 46 at a location centrally positioned between the main seal 30 and the inboard seal 32, and the reverse taper ramp 76 extends from the plateau 74 to about the flange 22.

The outboard or distal seal 34 is located between the main seal 30 and the distal end 38, axially spaced from each. Like the seals 30,32, the outboard seal 34 is adapted to provide a fluid seal and a mechanical connection with the pipe 18. In the illustrated embodiment, the outboard seal 34 is a single tooth which can be referred to as the outboard isolation tooth. The outboard isolation tooth 34 is positioned adjacent the distal end 38 and axially spaced inwardly slightly therefrom. It is to be appreciated by those skilled in the art that the outboard seal 34 can alternately be formed of a plurality of teeth, separated from one another by one or more appropriate grooves.

The connector body 12 of the illustrated embodiment further includes at least one anti-torsion ridge 80 located between the main seal 30 and the outboard seal 34. In the illustrated embodiment, the at least one anti-torsion ridge 80 is a single ridge positioned adjacent the outboard isolation tooth 34, but axially spaced inwardly therefrom. The torsion ridge 80 of the illustrated embodiment is primarily provided to carry torsion loads between the connector body 12 and the pipe 18. The anti-torsion ridge 80, also referred to herein as a torsion ridge, is spaced axially outwardly from the main seal 30 a sufficient distance so that a reduction of the diameter of pipe 18 by the main seal 30 does not interfere with engagement between the torsion ridge 80 and the pipe 18. The torsion ridge 80 preferably has friction surfaces (not shown) which can be formed by knurling, broaching or the like to better resist torsion loads. Further details concerning the anti-torsion ridge 80 and its function are provided in commonly owned U.S. Pat. Nos. 6,692,040 and 6,131,964, both expressly incorporated herein by reference.

As taught in the above-referenced '040 patent, in an alternate embodiment, the outboard isolation tooth 34 can be replaced and/or serve as a distal torsion ridge, in addition to or in replacement of the torsion ridge 80. Similar to and/or with the torsion ridge 80, the distal torsion ridge would primarily serve to carry torsion loads between the connector body 12 and the pipe 18. When both are employed, the spacing between the torsion ridge 80 and the alternate distal torsion ridge is sufficient to prevent pipe reductions caused by either one of the torsion ridges from affecting the other. Like the ridge 80, the alternate distal torsion ridge can include a frictional surface formed by knurling, broaching or the like to better resist torsion loads.

Returning to the illustrated embodiment, the outside surface 24 has a distal portion 84 between the land 46 and the distal end 38. The distal portion 84 has a relatively smaller outer diameter than the lands 46,70, as well as the flange 22. The distal portion 84 of the connector body 12 also has an increased friction section 86, also referred to as a locking mechanism, adjacent the distal end 38. In the illustrated embodiment, the friction section 86 includes a plurality of ridges 88 separated from one another by grooves 90 to better retain the swage ring 14 on the connector body 12 once the swage ring 14 is fully installed on the body 12. More particularly, the friction ridges 88 assist in preventing the swage ring 14 from slipping or working off the connector body 12. Another feature provided adjacent the distal end 38 is taper 92 which preferably has a taper angle of about twenty degrees (20°). The taper 92 assists in initially installing the swage ring 14 onto the connector body 12. Both features 86 and 92 are more fully described in the above-incorporated '040 and '964 patents.

Figure 3:
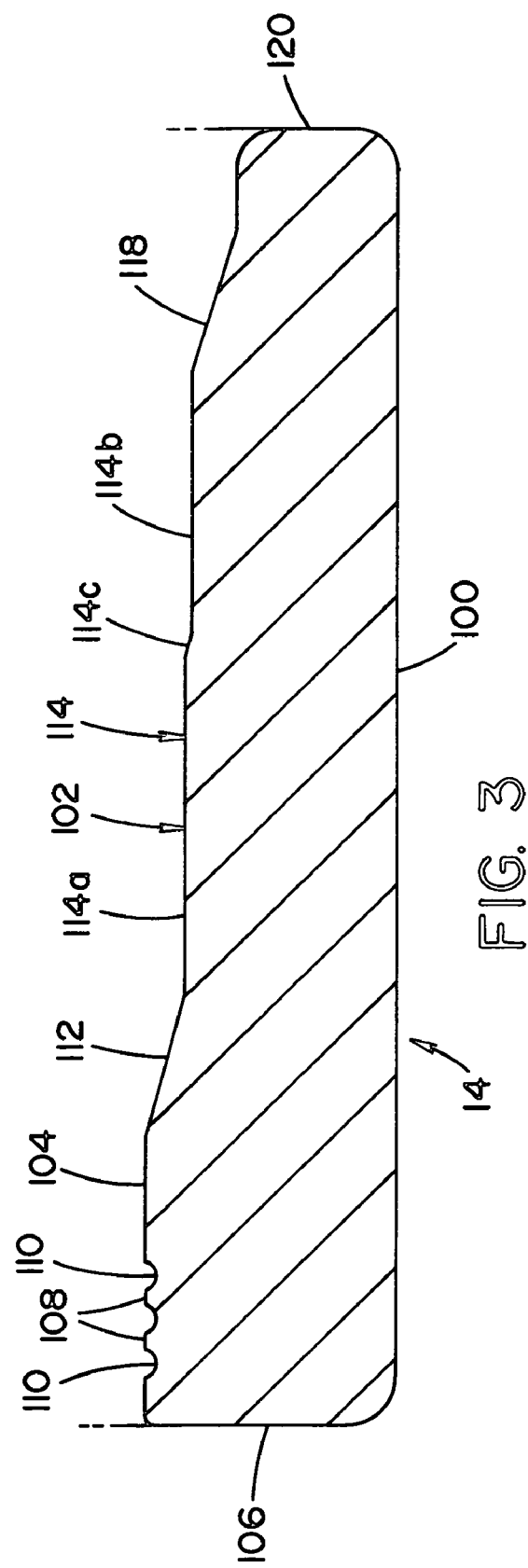
FIG. 3 is an enlarged partial cross-sectional view of the swage ring of FIG. 2.

With additional reference to FIG. 3, the swage ring 14, also referred to herein as a drive ring, is sized to be annularly received over and axially forced along the sleeve 12a toward the flange 22 for urging the seals 30,32,34 into the pipe 18 to seal and mechanically connect the body 12 with the pipe. Like the sleeves 12a,12b, ring 14 will primarily be the ring described in further detail herein. However, it is to be appreciated that ring 16 is essentially identical and shares like elements. More specifically, in the illustrated embodiment, the swage ring 14 includes an exterior surface 100 having a relatively constant outside diameter. The swage ring 14 further includes an interior surface 102 defining a throughhole into which the coupling sleeve 12a is received when the ring 14 is installed onto the connector body 12 (see FIG. 1). More particularly, the interior surface 102 includes distal compression surface or portion 104 positioned adjacent swage ring distal end 106. In the illustrated embodiment, the compression surface 104 includes a plurality of ridges 108 separated from one another by grooves 110, which can be collectively referred to as a friction section or a locking mechanism. The ridges and grooves 108,110 assist in better retaining the swage ring 14 on the connector body 12 when the ring is fully installed on the body 12. More particularly, the friction ridges 108 and grooves 110 assist in preventing the swage ring 14 from slipping or working off the distal end 38 of the connector body 12. Preferably, the locking mechanism 108,110 of the compression portion 104 cooperates and/or works in conjunction with the locking mechanism 88,90 of the connector body 12.

A tapered surface or portion 112 connects the distal compression surface 104 with a proximal compression surface or portion 114. As shown, the proximal compression surface has an increased diameter relative to the distal compression surface 104. In the illustrated embodiment, the proximal compression surface is formed of a first segment 114a adjacent the tapered surface 112, a second segment 114b spaced further inward relative to the distal end 106 than the first segment 114a, and a kick-down tapered segment 114c connecting the first segment 114a to the diametrically larger second segment 114b. A proximal taper 118 of the surface 102 flares open adjacent proximal end 120 for facilitating easier insertion of the sleeve 12a, and particularly the lands 46,70 of the sleeve 12a, into the throughhole of ring 14 when the ring is installed onto the body 12. In the illustrated embodiment, the angle of the proximal taper 118 substantially matches the angle of the upslope ramp 48 (see swage ring 16 of FIG. 1) and facilitates axial movement of the swage ring 14 past the lands 46,70.

With reference to the right side of FIG. 1, the swage ring 16 is shown partially installed or preassembled on the connector body 12 (specifically, sleeve 12b) in a pre-install or distal position. In this position, swage ring taper 112 of ring 16 is adjacent, but slightly spaced relative to, the main seal land ramp 48 of sleeve 12b. Through an interference fit, the swage ring 16 is maintained and can be shipped to customers in the pre-install position on the connector body 12, which facilitates ease of use and installation by the ultimate end-users. In particular, ease of use is facilitated by the fitting 10 being maintained as a partially assembled one-piece assembly, as opposed to the components of the assembly being multiple pieces separate from one another.

Specifically, the diameter of segment 114b of ring 16 is slightly smaller than the exterior diameter of the distal portion 84 of sleeve 12b so that the interference fit is formed when the swage ring 16 is axially forced onto the connector body sleeve 12b to the pre-install position. Though the interference fit causes the sleeve 12b to partially contract radially, a sufficient inner diameter is maintained for all the seals 30,32,34 and the torsion ridge 80 so that a pipe can be inserted into the sleeve 12b. The sufficient inner diameter is large enough to accommodate a manufacturing tolerance of the fitting body 12, to accommodate a manufacturing tolerance of a pipe and to maintain a clearance gap between the sleeve 12b and its pipe that allows relatively easy insertion of its pipe thereinto.

To fully install the swage ring 14 or 16 onto the sleeve 12a or 12b with a pipe, such as the pipe 18, inserted therein for purposes of mechanically connecting and sealing the fitting 10 to the pipe, an installation tool (not shown) can be used to further force the swage ring onto its sleeve toward the tool engaging flange 22. One suitable installation tool is described in commonly-owned U.S. Pat. No. 5,305,510, expressly incorporated herein by reference. As will be known and appreciated by those skilled in the art, the installation tool has opposed jaws that engage the tool engaging surface 26 of the flange 22 and the swage ring distal end 106 and are actuated to force or press the swage ring toward the flange to a final installation position (such as swage ring 14 is shown in FIG. 1). Axial movement of the swage ring onto the connector body 12 with the pipe inserted therein causes radial movement of the fitting body 12, and particularly the seals 30,32,34 of the sleeve, toward or into the pipe to create seals and mechanical connections therewith.

More specifically, when ring 14 is installed onto the connector body sleeve 12a, the inboard seal land 70 is engaged by the proximal compression surface 114 of a swage ring 14 so that the proximal seal 32 is urged or compressed into sealing engagement with the pipe 18. When the swage ring 14 is moved onto the connector body 12 toward flange 22, the main seal 30 is also urged or compressed inwardly against the pipe 18 by compression forces from compression surface 114 of the swage ring 14. More particularly, the compression surface 114 engages the main seal land 46 to compress inwardly the main seal 30 into the pipe 18. The proximal torsion ridge 80 is also urged or compressed inwardly into the pipe 18 by surface 104 of the swage ring 14. Like the torsion ridge 80, the outboard isolation tooth 34 is also urged or compressed inwardly into the pipe 18 by the distal surface 104 when the swage ring 14 is installed onto the connector body 12.

Preferably, the design of the connector body 10 is such that when the swage ring 14 is urged over the coupling body 12, the main seal 30 is urged into substantial biting and sealing engagement with the outer surface of the tube 18. This sealing is caused when the surface 114 engages the land 46. The isolation tooth 34 and the proximal seal 32 are each designed to make at least a minimal bite into the outer surface of the tube 18. Preferably, the connector body 12 is configured so that the proximal seal 32 bites into the tube 18 an amount less than the isolation tooth 34 and the isolation tooth 34 bites into the tube 18 an amount equal to or less than the amount the main seal 30 bites into the tube 18.

The purpose of the main seal 30 is to substantially engage the surface of the tube 18 in order to provide a hermetic seal so that no fluid flowing through the tube 18 can be released between the seal 30 and the tube 18. When forced by the swage ring 14, the seal 30 bites into the outer surface of the tube 18 and, simultaneously, the main seal's teeth 40,42 are possibly deformed so as to fill any of the rough or irregular surface imperfections commonly found on the outside of tube 18. The teeth 40,42 are sufficiently wide and have a profile such that they can resist tensile loading along the axis of the tube 18 which could occur should there be a force on the tube 18 which might tend to pull it axially from the connector body 12. The outboard isolation tooth 34 and the proximal seal 32 serve to prevent pivoting or rocking of the tube 18 about a fulcrum established where the main seal's teeth 40,42 bite into the tube 18. Accordingly, the tube 18 is prevented from bending or flexing about the main seal 30, thus preventing relative motion between the main seal 30 and the tube 18 and thus leakage at the point where the seal 30 engages the tube 18.

When the swage ring 14 is forced onto the connector body 12, distal outside diameter portion 84 of the connector body 12 is compressed by distal compression surface 104 of the swage ring 14. As already mentioned, the main seal land 46 of the connector body sleeve 12a is compressed by compression surface 114. The reduction in diameters from the segment 114b to the segment 114a provides a kick-down effect more fully described in commonly-owned U.S. Pat. No. 5,709,418, expressly incorporated herein by reference. Further details of the sequential loading caused as the swage ring 14 is axially moved onto the connector body 12 are provided in the above-referenced applications, all of which have been expressly incorporated herein by reference. Of course, as will be appreciated by those skilled in the art, the fitting 10 need not include the kickdown feature to achieve the advantages of the low volume crevice. Thus, in alternate embodiment, the fitting 10 could be formed without the kickdown feature.

The close location of the proximal seal 32 relative to the shoulder 60 reduces or limits a crevice volume defined between the coupling body 12 and the tube 18. More particularly, although not visible in the FIGURES, there is a gap, space or area between the end of the tube 18 and the shoulder 60 that forms the crevice volume. As shown, when the connector body is machined a small radius 130 is disposed between the inner tooth 56 of the proximal seal 32 and the stop 60 which blends the tooth 56 into the stop 60. When the swage ring 14 is fully moved onto the connector body 12, the engagement between the proximal surface 114 of the swage ring 14 and the proximal land 70 forces the teeth 54,56 into the tube 18, as already mentioned, and also forces the connector body 12 around the teeth 54,56 at location 132 into the tube 18. As a result, the radius 130 moves radially into the tube 18 and forms a sealing surface with the tube 18. Thus, the crevice volume is sealed off by the engagement of the radius 130 with the tube 18 and the engagement of the proximal seal 32 with the tube 18.

Figure 4:
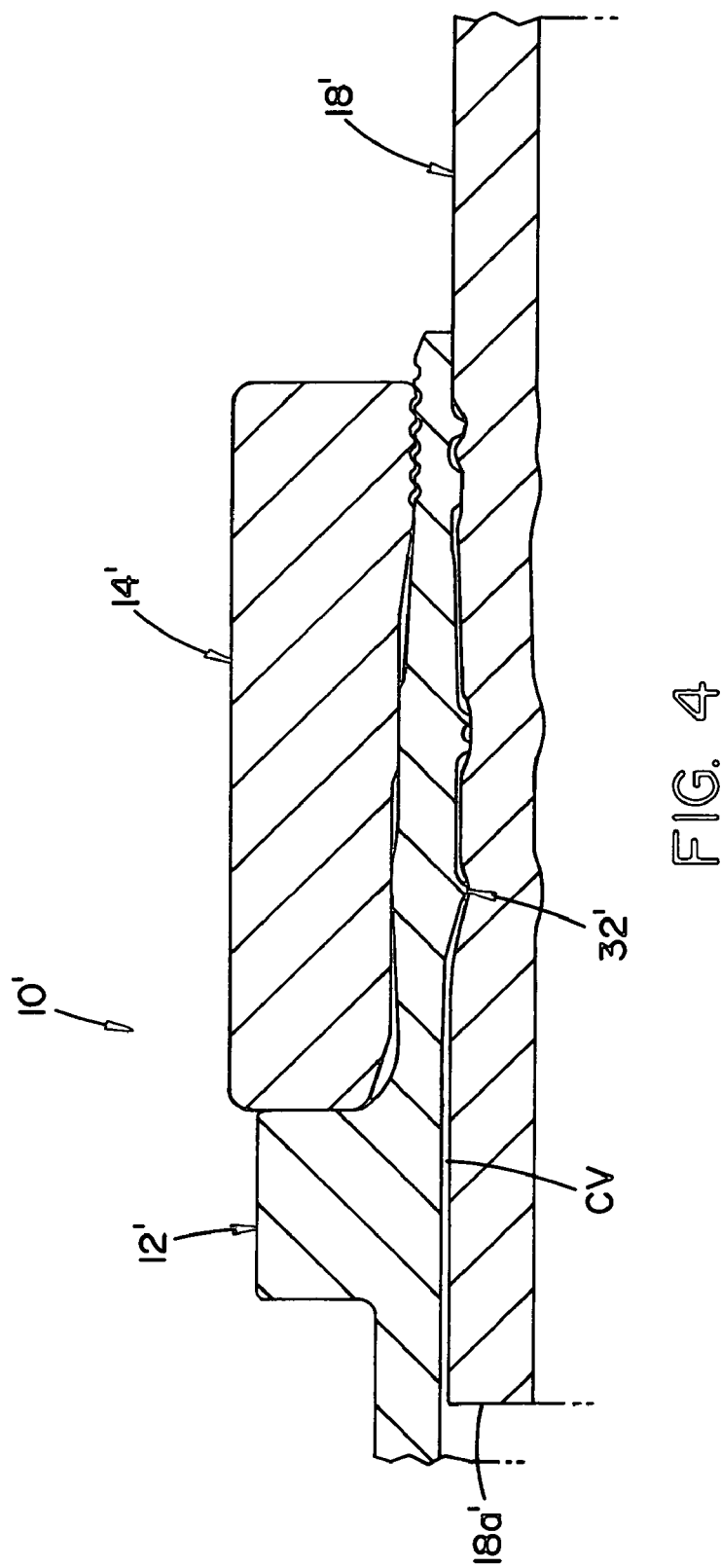
FIG. 4 is a cross-sectional view of a fitting without a low volume crevice including a coupling body and a swage ring for connecting to a tube or pipe.

Fluid or any other substance passing through the tube 18 into the fitting 10 or from the fitting 10 into the tube 18 can, if small enough, occupy the crevice volume. However, by positioning the proximal seal 32 as close as possible to the shoulder 60 and/or the end 18a of the pipe 18, the crevice volume is reduced or made as small as possible. As a result, in one exemplary embodiment, the proximal seal 32 is immediately adjacent the shoulder 60, i.e., as close as possible without detrimentally affecting the sealing ability of the proximal seal 32. In contrast, with reference to FIG. 4, a fitting of Applicant Lokring Technology Corporation is shown that does not include a shoulder adjacent a proximal sealing tooth. The fitting 10' includes a connector body 12' and a swage ring 14' for connecting to a pipe 18'. The connector body 12' includes no shoulder and a proximal seal 32' is spaced apart from a pipe end 18a'. In this arrangement, the crevice volume CV is relatively large ending axially between the pipe 18' and the connector body 12' from pipe end 18a' to proximal seal 32'.

in an alternate embodiment, a non-metallic material such as an elastomeric material is placed between the end of the tube 18 and the shoulder 60 to form a sealing gasket. The gasket could further reduce and/or eliminate the crevice volume between the fitting and the tube 18. In an exemplary arrangement, the gasket material could be captively held in position on the fitting when the fitting is manufactured.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is;

1. A fitting for a fluid conduit, comprising:
 a coupling body having an inside surface for engaging an outside surface of an associated fluid conduit and a shoulder portion for limiting axial insertion of the associated fluid conduit into said coupling body;
 a proximal seal formed on said inside surface of said coupling body immediately adjacent said shoulder portion, said proximal seal including an inner tooth that transitions directly into a radius, said radius disposed between said inner tooth and said shoulder portion and directly transitioning into said shoulder portion which blends said tooth into said shoulder portion, wherein an axial distance between said proximal seal and said shoulder portion is less than an axial width of said proximal seal;

a ring annularly disposed on said coupling body urging said proximal seal into said fluid conduit to seal and mechanically connect said coupling body to the fluid conduit;

a main seal formed on said inside surface of said coupling body axially spaced from said proximal seal and said main seal is axially spaced from said proximal seal a distance sufficient to allow said main seal and said proximal seal to form seals and mechanical connections by engaging and deforming the associated fluid conduit without interfering with one another;

a main seal land formed on an outside surface of said coupling body opposite said main seal; and proximal seal land formed on said outside surface of said coupling body opposite said proximal seal, said proximal seal land axially spaced apart from said main seal land;

wherein each of said main seal land and said proximal seal land include a plateau axially flanked by a pair of ramps and radially spaced relative to said outside surface, said plateau of said main seal land being radially aligned with and having substantially the same diameter as said plateau of said proximal seal land and being axially spaced relative thereto such that adjacent ramps of said main and said proximal seal lands form a recess therebetween.

2. The fitting of claim 1 further including a seal land formed on an outside surface of said coupling body adjacent said proximal seal and about radially opposed and axially aligned with said shoulder portion, said ring engages said seal land to force said proximal seal and at least a portion of said inside surface immediately adjacent said proximal seal into engagement with an outer surface of the associated fluid conduit.

3. The fitting of claim 1 wherein said coupling body includes a frictional area on an outside surface of said coupling body and adjacent a distal end of said coupling body, said frictional area for limiting axial movement of said ring relative to said coupling body.

4. The fitting of claim 1 wherein said coupling body includes a torsion ridge formed on said inside surface and having friction surfaces that circumferentially resist torsion between said coupling body and the associated fluid conduit.

5. The fitting of claim 1 further including a second coupling body in back to back relationship with said first coupling body for joining a first associated conduit to a second associated conduit, said second coupling body being at least one of formed integrally with and attached to said coupling body, said second coupling body also being substantially identical to said coupling body.

6. A filling for making connections with a pipe, comprising:

a coupling body having an inside surface defining a bore for receiving an associated pipe, a radial section is defined along said inside surface to limit axial insertion of the associated pipe;

a ring fitting over said coupling body for sealing and mechanically connecting said coupling body to the associated pipe;

an axisymmetrical main seal formed on said inside surface of said coupling body configured to seal and to connect to the associated pipe when said ring is installed on said coupling body;

an axisymmetrical inboard seal formed on said inside surface of said coupling body, said inboard seal located immediately adjacent said radial section to reduce to as small as possible a crevice volume formed radially between said coupling body and the associated pipe and axially between said inboard seal and radial section, said inboard seal configured to seal and to connect to the associated pipe when said ring is installed on said coupling body;

a radius disposed between said inboard seal and said radial section, said inboard seal directly transitioning into said radius and said radius directly transitioning into said radial section, said radius configured to seal and to contact the associated pipe when said ring is installed on said coupling body, wherein an axial distance between said inboard seal and said radial section is less than an axial distance between said main seal and said inboard seal;

an axisymmetrical outboard seal formed on said inside surface of said coupling body, said outboard seal axially spaced from said main seal and seals and connects to the associated pipe when said ring is installed on said coupling body; and a main seal land on an outside surface of said coupling body radially aligned with said main seal and an inboard seal land on said outside surface of said coupling body radially aligned with said inboard seal, said seal lands axially spaced apart by a recess and engaged by said ring when installed on said coupling body to force and hold said main seal and said inboard seal in sealing and mechanically connecting relation with the associated pipe.

7. The fitting of claim 6 wherein said inboard seal includes a plurality of teeth for engaging and deforming the associated pipe.

8. The fitting of claim 6 further including at least one anti-torsion ridge on said inside surface of said coupling body, said anti-torsion ridge having a frictional surface that resists torsion between said coupling body and the associated pipe.

9. The filling of claim 8 wherein said at least one anti-torsion ridge is located adjacent a distal end of said coupling body and axially spaced between said outboard seal and said distal end.

10. The fitting of claim 8 wherein said at least one anti-torsion ridge includes a distal torsion ridge and a proximal torsion ridge axially spaced from said distal torsion ridge.

11. The filling of claim 6 wherein said coupling body includes a circumferential flange having a tool engaging face for engaging a tool for forcibly installing said ring onto said coupling body, said radial section axially disposed between said flange and said inboard seal.

12. The fitting of claim 11 wherein said inboard seal land includes an upslope ramp, a plateau and a downslope ramp, said plateau being immediately opposite said inboard seal and said radial section and said downslope ramp extending from said platform toward said flange.

13. The fitting of claim 6 wherein at least one of said coupling body and said ring include circumferential ridges separated by grooves for engaging the other of said at least one of said coupling body and said ring to retain said ring on said coupling body.

14. The fitting of claim 6 wherein said ring is a swage ring including:

a proximal compression surface having a first proximal segment for sequentially sealing and mechanically connecting said main seal and then said inboard seal to the associated pipe;

a distal compression surface for sealing and mechanically connecting said outboard seal to the associated pipe after said proximal compression surface seals and mechanically connects said inboard seal to the associated pipe, said distal compression surface having a smaller diameter than said proximal compression surface; and a second distal segment of said proximal compression surface having a smaller diameter than said first proximal segment for applying said restoring load to said main seal after said outboard seal is sealed and mechanically connected to the associated pipe.

15. The fitting of claim 6 wherein at least one of said coupling body and said ring configured to apply a restoring load to said main seal to further seal and mechanically connect said main seal to the associated pipe after said inboard and outboard seals seal and connect to the associated pipe.

* * * * *